United States Patent Office 3,095,242
Patented June 25, 1963

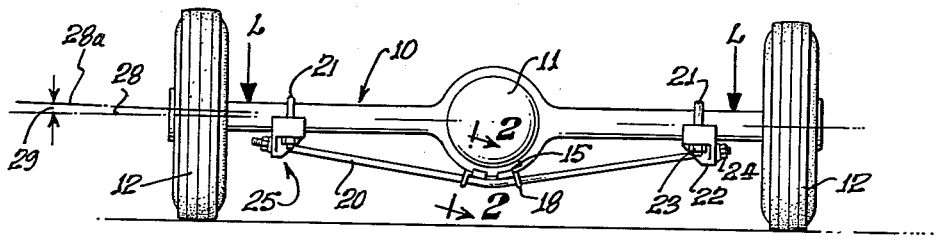
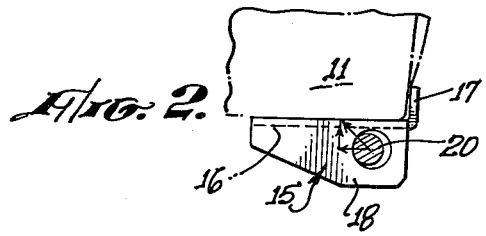
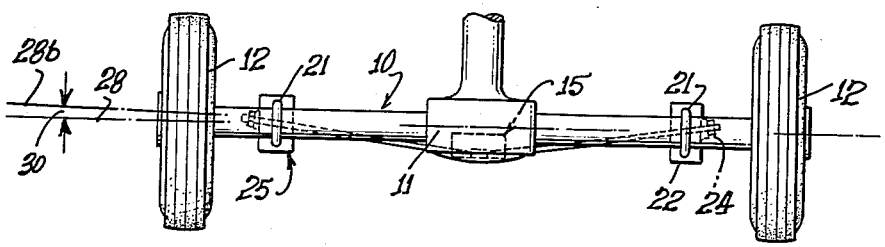
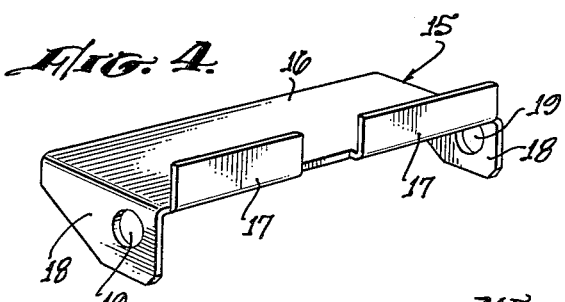

3,095,242
BRACE ASSEMBLY FOR AXLE HOUSINGS
Wien A. van der Wilt, 320 Lafayette St.,
Glendale 5, Calif.
Filed July 2, 1962, Ser. No. 206,751
1 Claim. (Cl. 301—129)

The present invention relates generally to automotive vehicles and more especially to a brace construction for the rear axle housing of such a vehicle.

Automobiles, whether passenger or truck, almost universally use a live rear axle assembly comprising a stationary housing in which are enclosed differential or other gears, the rotating axles connected to the wheels of the vehicle, and necessary bearings. The load of the vehicle is supported on the axle housing which in turn is supported from the road surface by the wheels. Thus the axle acts as a beam supported at its two ends with loads applied at two points between the supports, the latter being the vehicle wheels.

As is well known, vertically applied loads on the axle housing, both live and dead, cause the housing to deflect downwardly between the supporting wheels, the housing becoming concave upwardly. This deflection of the housing causes undue wear on the tires because the wheels are forced out of alignment, that is they no longer rotate in vertical planes. It also misaligns the bearings for the differential gears and axles and often overloads the gears in the differential, ultimately causing failure of gears or other rotating parts.

A similar misalignment of the rear wheels but in a different direction, is caused by the horizontal loads imposed on the housing by the thrust of the wheels on the road surface, especially when the vehicle is accelerating or is operating under heavy load requiring full power of the engine, as when climbing a hill. This thrust is horizontal and tends to make the housing concave forwardly, the rear wheels toeing in slightly. This toe-in means that the two rear wheels are turning in planes not parallel to each other or to the direction of vehicle movement. Toe-in is evidenced especially by tire wear, as each rear tire is scuffed or worn by being in effect dragged over the road surface as the vehicle moves forwardly, the drag being an amount determined by the degree of toe-in. Obviously this horizontal deflection of the axle housing causing the toe-in condition adds to the same unfavorable conditions mentioned above, namely misalignment of the bearings and overloading of the gears.

Straightening of the rear axle housing and aligning of the rear wheels is often necessary when the deflection of the housing from either or both causes described is sufficient to cause it to take a permanent set. Heretofore this has been done by mechanically bending the axle in a reverse direction to return the housing to its correct or undeflected position. Obviously, this requires initially stressing the axle beyond the point at which it is in proper position in order to allow for the normal spring back after the straightening forces are released. This conventional procedure can have various bad effects. One is actual cracking or breaking of the housing and another is a permanent deflection of the housing which misaligns all of the rear axle bearings.

Hence, it is a general object of the present invention to effect and maintain proper alignment of the rear axle housing and wheels of an automotive vehicle by simple and inexpensive means which may be applied permanently to the axle housing.

It is also an object of the present invention to eliminate the need of excessively bending an axle housing in order to straighten it or correct its alignment, thus eliminating the unfavorable possibility of cracking or otherwise injuring the housing or producing a permanent unfavorable set to the housing which misaligns the bearings.

These objects and others are achieved according to the present invention by providing a brace construction for the axle housing of an automotive vehicle that comprises a plate-like bearing member engaging both downwardly and rearwardly facing surfaces on the axle housing at a central position thereof, normally the portion of the housing enclosing the differential gears; a tension rod passing underneath and bearing against the bearing member at a position rearwardly of the axis of the axle; and attachment means at each end of the tension rod attaching the rod to the axle housing at positions spaced horizontally and vertically as well as axially of the housing from the position of engagement of the rod and the bearing member. When the tension rod is tightened to place it under a suitable degree of tension, it pulls rearwardly and downwardly on the axle housing at the points of attachment of the ends of the rod thereto and these tension forces in the rod have upwardly and forwardly directed components which are transmitted to the axle housing centrally thereof by the bearing member. As a result, by tightening the tension rod to the proper degree and/or by changing the angle of the rod with respect to the axis of the axle in order to obtain proper balance between the horizontal and vertical components of the forces produced thereby, the axle can be straightened and both the horizontal and vertical deflections eliminated, thus correcting the alignment of the ground supporting wheels.

How the above and other objects of the present invention are attained will be better understood by reference to the following description and the annexed drawing in which:

FIG. 1 is a diagrammatic rear elevation of an axle with ground supporting wheels and with the brace construction of the present invention attached thereto.

FIG. 2 is an enlarged fragmentary section on line 2—2 of FIG. 1.

FIG. 3 is a plan view of the axle with the brace construction attached thereto.

FIG. 4 is an enlarged perspective of the plate-like bearing member alone.

Referring now to the drawing, and especially to FIG. 1, there is shown a rear axle assembly comprising a stationary housing indicated generally at 10 and having an enlarged central portion 11 which encloses the differential gears, not shown in the drawing. At each end of axle housing 10 is a ground engaging wheel 12 rotatably mounted on the axle by suitable means, not shown in the drawing since they are well known. The load of the body is supported on the axles at positions inboard of the wheels at locations indicated by arrows L.

The brace construction designed to reinforce and straighten the axle housing includes a plate-like bearing member 15 shown in detail in FIG. 4. This bearing member has a plate portion 16 and a plurality of upstanding flange portions 17 at one edge of plate portion 16. When mounted in place on the axle housing, this one edge is the rear edge of the bearing emmber. At opposite lateral edges of plate portion 16 are depending flange portions 18, each of which is provided with an opening 19.

Bearing member 15 is positioned relative to the axle assembly as shown in detail in FIG. 2. The plate portion 16 is underneath the central enlargement 11 housing the differential with the upper face of plate portion 16 engaging a downwardly facing surface on the axle housing. The upstanding flange portions 17 are then in engagement with rearwardly facing surfaces on the axle housing, as seen in FIG. 2. Tension rod 20 passes underneath the plate portion and bends the plate portion of the bearing members to conform to the external surface of the axle housing, as seen in FIG. 1. To permit such bending, the two flange portions 17 are suitably spaced apart since if they were continuous across the rear edge of the plate they would act as a reinforcing member resisting such bending of plate portion 16. Tie rod 20 passes through the two openings 19 in depending flange portions 18 of the bearing member to hold the bearing member securely in place.

Each outer end of the tie rod 20 is attached to the axle at a point adjacent the applied loads L. The attachment means 25 at each end comprises a U-bolt 21 passing over the axle housing and a seat member 22 on the under side of the housing. U-bolt 21 has threaded ends and is provided with nuts 23 which can be tightened to clamp the U-bolt and seat onto the axle housing.

When once fastened securely to the axle at its ends, tension can be applied to the tension rod 20 by suitable means, such as nuts 24 on the threaded ends of the tension rod. It will be appreciated that other suitable means for tensioning the rod may be employed, such as a turnbuckle.

As may be seen in FIG. 1, tension rod 20 is inclined upwardly toward the axle from its low central point underneath the central portion of the axle housing. As may be seen in FIG. 3, the sections of the tension rod at each side of bearing member 15 are also inclined forwardly with respect to axis 28 of the axle housing. As a consequence of this inclined position of the sections of tie rod 20, the forces applied to the ends of the axle housing by the tension in the rod have downwardly and rearwardly directed components. Obviously, the reaction to this same tension in the rod applied to the central portion of the axle housing is in the opposite direction, as shown in FIG. 2. Accordingly, the bearing member transmits to the central portion of the axle housing a force having upwardly and forwardly directed components, as indicated in FIG. 2.

The normal loading on the axle applied by the springs at positions L causes the central portion of the axle housing to sag, the housing axis becoming concave upwardly. As a result, the axis of the housing is deflected to position 28a by a distance shown exaggerated at 29 in FIG. 1. The tension in rod 20 produces forces in a vertical plane acting on the axle housing which restores axis 28 to its proper position and eliminates the deflection 29 in the axis.

In the same general fashion, the horizontally applied forces on the axle housing as a result of driving or accelerating the vehicle cause the ends of the axle to move forwardly with respect to the central portion, producing a forwardly concave condition of the housing and moving axis 28 to the position 28b shown in FIG. 3. Thus, there is a toe-in condition of the rear wheels produced as a result of the deflection 30 of the axis 28, shown in exaggerated amount in FIG. 3. In actual practice this deflection may be 3/16 inch or more. Since the inclination of tie rod 20 with respect to the axle housing in a horizontal plane is such that horizontally directed forces are applied to the axle housing to counteract the forces creating the toe-in condition, tension in rod 20 eliminates the deflection 30 and restores the axle axis from position 28b to position 28 in FIG. 3.

The mechanic not only has available to him the amount of tension in rod 20 which he can apply by tightening nuts 24 to straighten or align the axle housing, but he can also change the inclination of rod 20 with respect to the housing. This is accomplished by rotating one or both end fastening means 25 about the axle housing which can be done since the U-bolt and seat member 22 are rotatable about axis 28 when nuts 23 are loosened to swing each end of rod 20 individually forwards or backwards. As a consequence, for a given tension in rod 20, the distribution of the force between the horizontal and vertical components can be varied. The brace construction not only can be utilized to restore the axle housing to its proper alignment after it has once taken a permanent set but it can also be left in place as a part of the regular axle assembly so that the housing is maintained in proper alignment under operating conditions. This eliminates the need for mechanically bending the housing beyond its true position once it is restored to that correct position, in order to allow for springback after the housing is mechanically bent.

From the foregoing description, it will be understood that various changes in the detailed construction and arrangement of the parts of the brace constituting the present invention may occur to persons skilled in the art but without departing from the spirit and scope of the present invention. Accordingly, it is to be understood that the foregoing description is considered to be illustrative of, rather than limitative upon, the invention as defined by the appended claim.

I claim:

A brace construction in combination with a rear axle housing of an automotive vehicle, said housing having a central enlarged portion projecting both downwardly and rearwardly below and behind laterally extending housing portions, and said central enlarged portion having a downwardly facing lower surface and a rearwardly facing and substantially vertical rear surface, said surfaces lying at a substantial angle to each other;

said brace construction embodying a bearing member which includes an elongate plate bearing upwardly against said downwardly facing axle housing surface with its longer dimension in the direction of the laterally extending axle housing length, a pair of upstanding flanges at the rear longitudinal edge of said plate, said flanges being spaced apart longitudinally of the plate and engaging said rearwardly facing surface at spaced areas, a pair of flanges depending from the longitudinal end edges of said plate, each of said depending flanges having an opening located near the rear longitudinal plate edge, a single tension rod extending through said openings between rod ends located near the outer ends of the lateral housing portions, clamps engaging the outer end parts of the lateral housing portions and rotatively adjustable in set positions about said portions, and the ends of the single tension rod engaging said clamps and provided with tension adjusting means.

References Cited in the file of this patent

UNITED STATES PATENTS

| | | |
|---|---|---|
| 1,108,812 | Sunvold | Aug. 25, 1914 |
| 1,120,933 | Groves | Dec. 15, 1914 |
| 2,602,007 | Van Der Wilt | July 1, 1952 |